(12) United States Patent
Koyama

(10) Patent No.: US 11,016,707 B2
(45) Date of Patent: May 25, 2021

(54) CONTROL DEVICE, CONTROL METHOD, AND RECORDING MEDIUM TO DETECT A STATE OF ACCESS TO TABLE DATA AND SET A WRITING DESTINATION

(71) Applicant: NIPPON TELEGRAPH AND TELEPHONE CORPORATION, Tokyo (JP)

(72) Inventor: Takaaki Koyama, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 16/618,799

(22) PCT Filed: Jun. 5, 2018

(86) PCT No.: PCT/JP2018/021626
§ 371 (c)(1),
(2) Date: Dec. 3, 2019

(87) PCT Pub. No.: WO2018/225752
PCT Pub. Date: Dec. 13, 2018

(65) Prior Publication Data
US 2020/0089433 A1    Mar. 19, 2020

(30) Foreign Application Priority Data

Jun. 8, 2017  (JP) .............................. JP2017-113395

(51) Int. Cl.
*G06F 13/00* (2006.01)
*G06F 3/06* (2006.01)

(52) U.S. Cl.
CPC ............ *G06F 3/0659* (2013.01); *G06F 3/061* (2013.01); *G06F 3/0674* (2013.01)

(58) Field of Classification Search
CPC ...... G06F 3/0659; G06F 3/061; G06F 3/0674; G06F 16/1805; G06F 3/064; G06F 3/068
See application file for complete search history.

(56) References Cited

U.S. PATENT DOCUMENTS 8,782,334 B1 *   7/2014   Boyle .................. G06F 3/0656
                                                             711/111
2012/0222002 A1   8/2012   Harrison
                           (Continued)

FOREIGN PATENT DOCUMENTS

JP    2014-153872 A     8/2014
WO    2014/068820 A1    5/2014

OTHER PUBLICATIONS

International Search Report and Written Opinion dated Aug. 7, 2018 for PCT/JP2018/021626 filed on Jun. 5, 2018, 6 pages including English Translation of the International Search Report.
(Continued)

*Primary Examiner* — Jing-Yih Shyu
(74) *Attorney, Agent, or Firm* — Xsensus LLP

(57) ABSTRACT

A control device according to the present invention includes: a memory; and processing circuitry coupled to the memory and configured to: detect a state of access to table data stored in a first logical disk of a physical disk and to which first data is written and a state of access to a write ahead log (WAL) stored in a second logical disk of the physical disk and to which second data is written or to a WAL stored in a second storage medium different from the physical disk and to which the second data is written, and acquire an I/O use ratio of the WAL and an I/O use ratio of the table data, and set a writing destination of the second data to one of the WAL stored in the second logical disk and the WAL stored in the second storage medium.

7 Claims, 9 Drawing Sheets

(56) References Cited

U.S. PATENT DOCUMENTS

2015/0286671 A1\* 10/2015 Ebiyama ............. G06F 16/2308
       707/692
2017/0371916 A1\* 12/2017 Shimamura ............. G06F 9/466

OTHER PUBLICATIONS

"Basic MySQL," vol. 4, InnoDB1, Retrieved from the Internet URL: http://qiita.com/yoheiW©github/items/8a5326a516ec4452e774 on May 24, 2017, 15 pages including English Translation.
Daithankar, S., and Berkus, J., "Tuning PostgreSQL for performance," Jul. 3, 2003, 7 pages.
"Evaluation of performance of RAID0 by SSD," technical note, concurrent systems, Retrieved from the Internet URL: http://www.concurrent.co.jp/technical/100513.html on May 24, 2017, 4 pages including English Translation.

\* cited by examiner

FIG.2

| INDEX | PRESCRIBED VALUE | SCORE |
|---|---|---|
| I/O USE RATIO AVERAGE | 35% OR LOWER | 0 |
| WAL WRITING FREQUENCY UPPER LIMIT | 60 TIMES PER SECOND | 0 |
| WRITING GRANULARITY RATIO | 0.03 OR LOWER | 0 |

FIG.3

| TOTAL SCORE | WRITING DESTINATION |
|---|---|
| 0 POINT | SECOND DISK |
| 1 POINT | EXTERNAL MEMORY |
| 2 POINT | PRIMARY MEMORY |

| INDEX | TABLE DATA LOGICAL DISK | WAL LOGICAL DISK |
|---|---|---|
| I/O USE RATIO | 30% | 60% |
| WRITING FREQUENCY | 10 TIMES PER SECOND | 80 TIMES PER SECOND |
| WRITING AMOUNT | 1000KB PER SECOND | 300KB PER SECOND |

113a

| INDEX | TABLE DATA LOGICAL DISK | WAL LOGICAL DISK |
|---|---|---|
| I/O USE RATIO | 20% | 70% |
| WRITING FREQUENCY | 10 TIMES PER SECOND | 80 TIMES PER SECOND |
| WRITING AMOUNT | 1000KB PER SECOND | 300KB PER SECOND |

113a

Y11

| INDEX | CALCULATED VALUE | |
|---|---|---|
| I/O USE RATIO AVERAGE | 45% | C1 |
| FREQUENCY OF WRITING TO WAL | 80 TIMES PER SECOND | C2 |
| WRITING GRANULARITY RATIO | 0.0375 | C3 |

114a

CONTROL DEVICE, CONTROL METHOD, AND RECORDING MEDIUM TO DETECT A STATE OF ACCESS TO TABLE DATA AND SET A WRITING DESTINATION

CROSS-REFERENCE TO RELATED APPLICATIONS

The present application is based on PCT filing PCT/JP2018/021626, filed Jun. 5, 2018, which claims priority to JP 2017-113395, filed Jun. 8, 2017, the entire contents of each are incorporated herein by reference.

TECHNICAL FIELD

The present invention relates to a control device, a control method, and a recording medium.

BACKGROUND ART

In a Linux (registered trademark) OS, MySQL (registered trademark) may be used as a database management system (DBMS). MySQL constructs a system that receives and stores new data in a DB as needed and performs processing based on the newly received data on small-scale hardware. Specifically, MySQL is a DBMS that manages writing of a small amount of high-frequency data to a write ahead log (WAL) and writing of a large amount of low-frequency data to table data in a secondary storage medium, such as a hard disk. In MySQL, updating is performed by the WAL to achieve atomicity consistency isolation durability (ACID) and provide practical performance (for details, refer to Non Patent Document 1).

It has been reported that PostgreSQL (registered trademark) serving as a DBMS used in the Linux OS can provide higher performance by storing the WAL in another high-speed storage device different from the storage device for the table data (refer to Non Patent Document 2, for example). There has been developed a method for dividing data into a number of blocks and cyclically sorting and storing the divided data in a plurality of hard disks, thereby constructing a high-speed disk system (RAID0) (refer to Non Patent Document 3, for example). There has also been developed a method for comparing an I/O processing amount issued from a host computer to a storage system with the largest processable amount in writing data to a plurality of storages and selecting logical paths for writing the data to the storages, thereby distributing the data to the storages.

CITATION LIST

Non Patent Citation

Non Patent Document 1: Basic MySQL, Vol. 4, InnoDB1, [online], [searched for on May 24, 2017], Internet <URL: http://qiita.com/yoheiW@github/items/8a5326a516ec4452e774>

Non Patent Document 2: Tuning PostgreSQL for performance, [online], [searched for on May 24, 2017], Internet <URL: http://www.varlena.com/GeneralBits/Tidbits/perf.html#fsync>

Non Patent Document 3: evaluation of performance of RAID0 by SSD|technical note|concurrent systems, [online], [searched for on May 24, 2017], Internet <URL: http://www.concurrent.co.jp/technical/100513.html>

SUMMARY OF INVENTION

Technical Problem

If a system that receives and stores new data in a DB as needed and performs processing based on the newly received data is constructed on small-scale hardware as a DBMS like MySQL, for example, on the Linux OS, the processing performance of the entire system may possibly deteriorate. Specifically, when MySQL is used, writing of high-frequency data to the DB may possibly be performed and exceed the performance of a secondary storage medium, and it may possibly take a longer time to write a small amount of high-frequency data to a WAL. As a result, a waiting time until completion of writing the data may possibly increase, thereby deteriorating the processing performance of the entire system.

In view of the disadvantages described above, an object of the present invention is to provide a control device, a control method, and a control program that avoid a high load due to writing of data to a secondary storage medium for a DB that receives writing of a small amount of high-frequency data and writing of a large amount of low-frequency data to a physical disk serving as the secondary storage medium.

Solution to Problem

To solve the above problem and attain the object, a control device according to the present invention includes: a memory; and processing circuitry coupled to the memory and configured to: detect a state of access to table data stored in a first logical disk of a physical disk and to which first data is written and a state of access to a write ahead log (WAL) stored in a second logical disk of the physical disk and to which second data is written or to a WAL stored in a second storage medium different from the physical disk and to which the second data is written, and acquire an I/O use ratio of the WAL and an I/O use ratio of the table data, and set a writing destination of the second data to one of the WAL stored in the second logical disk and the WAL stored in the second storage medium based on an average of the I/O use ratio of the WAL and the I/O use ratio of the table data acquired at the acquiring.

Advantageous Effects of Invention

The present invention avoids a high load due to writing of data to a secondary storage medium for a DB that receives writing of a small amount of high-frequency data and writing of a large amount of low-frequency data to a physical disk serving as the secondary storage medium.

BRIEF DESCRIPTION OF DRAWINGS

FIG. 2 is a diagram of an example of a data configuration of prescribed value information illustrated in FIG. 1.

FIG. 3 is a diagram of an example of a data configuration of writing destination definition information illustrated in FIG. 1.

EMBODIMENTS FOR CARRYING OUT THE INVENTION

Figure 1:
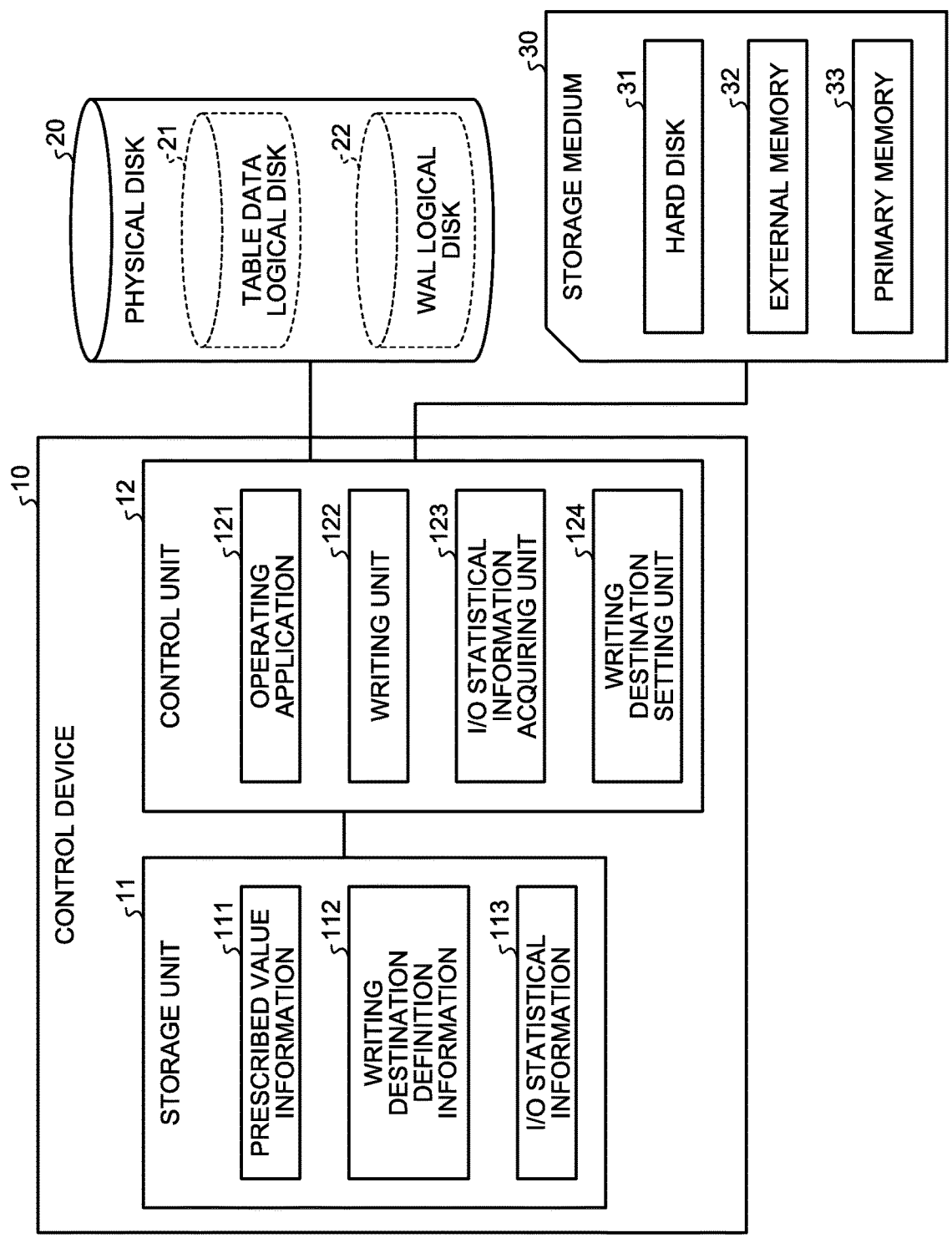
FIG. 1 is a diagram of a schematic configuration of a control device according to an embodiment.

An exemplary embodiment according to the present invention is described below in greater detail with reference to the accompanying drawings. The embodiment is not intended to limit the present invention. In the drawings, like reference numerals indicate like components.

Embodiments

A schematic configuration, a procedure of display control, and a specific example of a control device according to an embodiment is described first. To distribute loads in writing data to a physical disk based on the access characteristics of a DB to a secondary storage medium (physical disk), the control device according to the present embodiment changes a writing destination of a small amount of high-frequency data from the physical disk to a second storage medium different from the physical disk.

FIG. 1 is a diagram of a schematic configuration of the control device according to the embodiment. As illustrated in FIG. 1, a control device 10 according to the embodiment is connected to a physical disk 20 and a second storage medium 30 different from the physical disk 20 and used only for a WAL. The control device 10 introduces the Linux OS, for example.

The physical disk 20 is a secondary storage medium and divided into two logical disks. As illustrated in FIG. 1, the physical disk 20 is divided into a table data logical disk 21 (first logical disk) that stores therein table data and a WAL logical disk 22 (second logical disk) that stores therein a WAL. To the table data, a large amount of low-frequency data (first data) is written. To the WAL, a small amount of high-frequency data (second data) is written. The control device 10 controls writing of the table data to the table data logical disk 21 and writing of a small amount of high-frequency data to the WAL logical disk 22.

If the table data is written periodically, writing at higher frequency than that of the periodical writing is defined as high-frequency writing, and the periodical writing is defined as low-frequency writing. The amount of data written to the table data is significantly larger than that of data written to the WAL. Consequently, the amount of data written to the table data is defined as a large amount of data, and the amount of data written to the WAL is defined as a small amount of data.

The second storage medium 30 stores therein the WAL. The second storage medium 30 is a second hard disk 31, an external memory 32, or a primary memory 33, for example. The storage medium 30 may be other storage media illustrated in FIG. 1. The control device 10 controls writing of a small amount of high-frequency data to the WAL stored in these storage media 30.

The control device 10 manages both of writing of a large amount of low-frequency data and a small amount of high-frequency data to the physical disk 20 and writing of a small amount of high-frequency data to the second storage medium 30. The control device 10 includes a storage unit 11 and a control unit 12.

The storage unit 11 is a storage device, such as a hard disk drive (HDD), a solid state drive (SSD), and an optical disc. The storage unit 11 may be a semiconductor memory that can rewrite data, such as a random access memory (RAM), a flash memory, and a non-volatile static random access memory (NVSRAM). The storage unit 11 stores therein an operating system (OS) and various computer programs executed by the control device 10. The storage unit 11 also stores therein various kinds of information used for execution of the computer programs. The storage unit 11 stores therein prescribed value information 111, writing destination definition information 112, and I/O statistical information 113.

The prescribed value information 111 stores therein various prescribed values used for setting a writing destination of a small amount high-frequency data. FIG. 2 is a diagram of an example of a data configuration of the prescribed value information 111 illustrated in FIG. 1. As illustrated in a prescribed value table 111a in FIG. 2, the prescribed value information 111 has items of index, prescribed value, and score. The index, the prescribed value, and the score are set in advance based on the performance value of the physical disk and the access characteristics of the DBMS, for example.

The index is a change index for setting a writing destination of a small amount of high-frequency data. As illustrated in the prescribed value table 111a, one of the indexes is an I/O use ratio average. The I/O use ratio average is an average of an I/O use ratio of the WAL serving as a writing destination of a small amount of high-frequency data and that of the table data serving as a writing destination of a large amount of low-frequency data. Another one of the indexes is a WAL writing frequency upper limit indicating the upper limit per unit time of the frequency of writing to the WAL. Still another one of the indexes is a writing granularity ratio.

The writing granularity ratio is a value obtained by dividing the ratio of frequency of writing to the WAL per unit time to the amount of writing to the WAL by the ratio of frequency of writing to the table data per unit time to the amount of writing to the table data per unit time. The writing granularity ratio can be calculated by applying the frequency of writing to the WAL per unit time, the amount of writing to the WAL per unit time, the frequency of writing to the table data per unit time, and the amount of writing to the table data per unit time to Expression (1):

Expression 1

$$\text{WRITING GRANULARITY RATIO} = \frac{\left(\frac{\text{AMOUNT OF WRITING TO } WAL}{\text{FREQUENCY OF WRITING TO } WAL}\right)}{\left(\frac{\text{AMOUNT OF WRITING TO TABLE DATA}}{\substack{\text{FREQUENCY OF WRITING} \\ \text{TO TABLE DATA}}}\right)} \quad (1)$$

The prescribed values are determined in advance for the respective indexes. In the prescribed value table 111a, for example, the I/O use ratio average is associated with a prescribed value of "35% or lower". The WAL writing frequency upper limit is associated with a prescribed value of "60 times per second". The writing granularity ratio is associated with a prescribed value of "0.03 or lower".

The score is a deviation score indicating the degree of deviation of the calculated value of each index obtained from statistical information from the prescribed value of the index. To illustrate the initial state, all the score columns in the prescribed value table 111a in FIG. 2 have a value of 0. In the score columns, a writing destination setting unit 124, which will be described later, adds the score. The total of the scores in the respective score columns of the prescribed value table 111a corresponds to the deviation indicating the state of deviation of the prescribed values from the actual measured values of the indexes.

The writing destination definition information 112 is information that associates the deviation of the frequency of writing to the WAL and the writing granularity ratio from certain prescribed values with each of the storage media 30. FIG. 3 is a diagram of an example of a data configuration of the writing destination definition information 112 illustrated in FIG. 1. As illustrated in a writing destination definition table 112a in FIG. 3, for example, the writing destination definition information 112 associates the total of the scores in the respective score columns of the prescribed value table 111a with the storage medium 30 serving as the writing destination corresponding to the total score. The writing destination setting unit 124 (described later) calculates the deviation based on the result of comparison between each index and its prescribed value. The writing destination setting unit 124 refers to the writing destination definition table 112a and sets the storage medium 30 corresponding to the deviation as the writing destination of a small amount of high-frequency data.

Figures 4, 5:
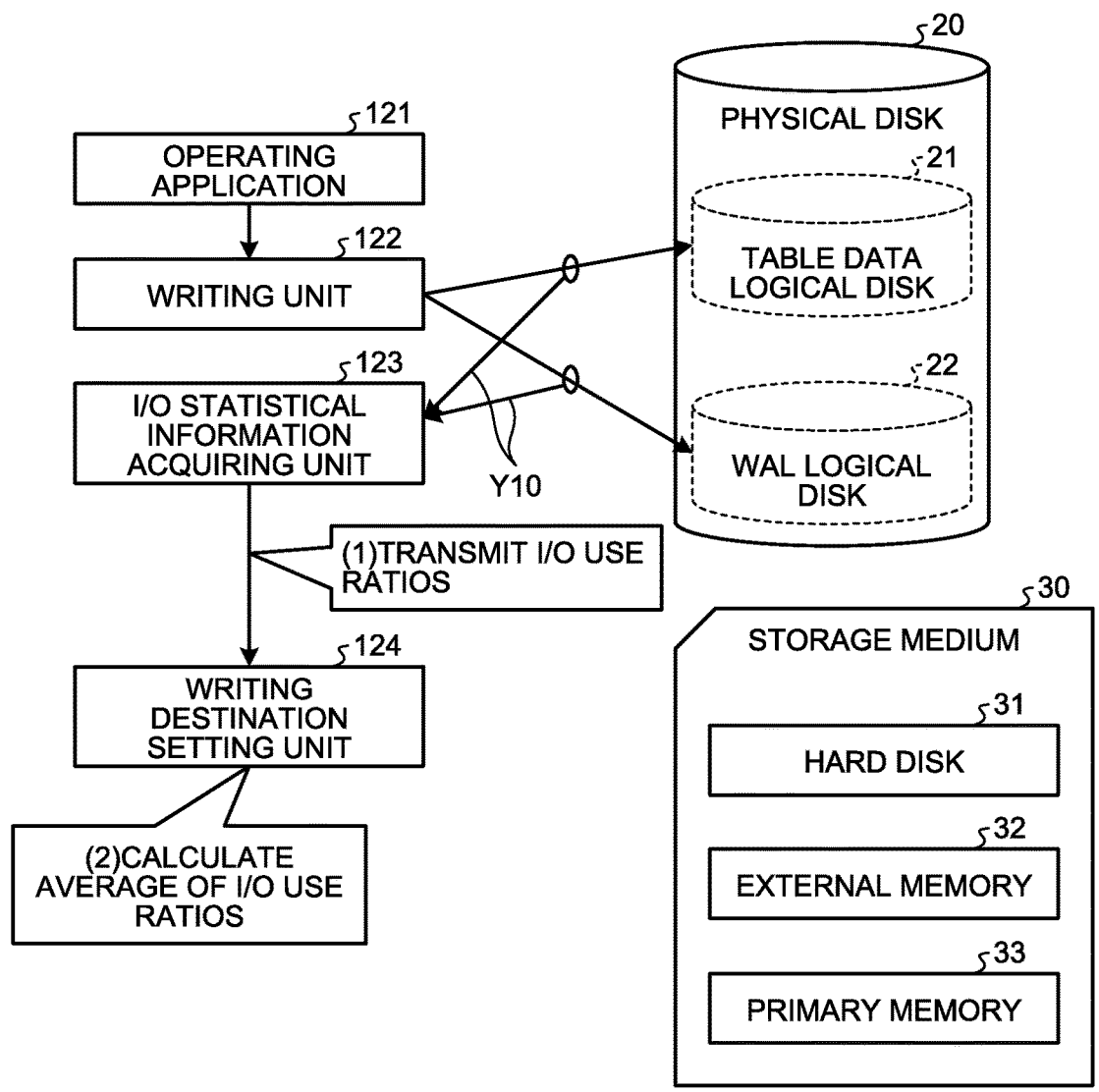
FIG. 4 is a diagram of an example of a data configuration of I/O statistical information illustrated in FIG. 1.
FIG. 5 is a diagram for explaining writing destination setting by the control device illustrated in FIG. 1.

The I/O statistical information 113 is statistical information on the state of access to the physical disk 20. FIG. 4 is a diagram of an example of a data configuration of the I/O statistical information 113 illustrated in FIG. 1. As illustrated in an I/O statistical information table 113a in FIG. 4, for example, the I/O statistical information 113 has items of index, table data logical disk, and WAL logical disk. As illustrated in FIG. 4, the index includes the I/O use ratio, the writing frequency, and the writing amount. The columns in the I/O statistical information table 113a are updated based on the I/O use ratio, the writing frequency, and the writing amount of the table data logical disk and the WAL logical disk acquired by an I/O statistical information acquiring unit 123 (described later).

The control unit 12 controls the entire control device 10. The control unit 12 is an electronic circuit, such as a central processing unit (CPU) and a micro processing unit (MPU), or an integrated circuit, such as an application specific integrated circuit (ASIC) and a field programmable gate array (FPGA). The control unit 12 includes an internal memory that stores therein computer programs and control data defining various procedures and performs processing using the internal memory. The control unit 12 functions as various processing units by executing various computer programs.

The control unit 12 includes an operating application 121, a writing unit 122 (writing device), the I/O statistical information acquiring unit (acquiring unit) 123, and the writing destination setting unit 124 (setting unit) used in various operations.

The writing unit 122 writes a large amount of low-frequency data to the table data stored in the table data logical disk 21 of the physical disk 20 based on the processing performed by the operating application 121. The writing unit 122 also writes a small amount of high-frequency data to one of the WAL stored in the WAL logical disk 22 of the physical disk 20 and the WAL stored in the second storage medium 30 based on the processing performed by the operating application 121. The writing unit 122 is a DBMS, such as MySQL and PostgreSQL (registered trademark). The operating application 121 and the writing unit 122 may be provided to another device connected to the control device 10 via a network, for example.

The I/O statistical information acquiring unit 123 detects the state of access to the table data stored in the table data logical disk 21 of the physical disk 20 and the state of access to the WAL stored in the WAL logical disk 22 of the physical disk 20 or the WAL stored in the second storage medium 30. In other words, the I/O statistical information acquiring unit 123 monitors the state of access of the writing unit 122 to the physical disk 20 and the second storage medium 30. The I/O statistical information acquiring unit 123 acquires statistical information on the state of access to the physical disk 20 and the second storage medium 30. Specifically, the I/O statistical information acquiring unit 123 acquires the I/O use ratio of the WAL, the frequency of writing to the WAL, the amount of writing to the WAL, the I/O use ratio of the table data, the frequency of writing to the table data, and the amount of writing to the table data. Besides the I/O use ratio of the WAL and the I/O use ratio of the table data, the I/O statistical information acquiring unit 123 acquires the frequency of writing to the WAL per unit time, the amount of writing to the WAL at one time, and the amount of writing to the table data at one time.

Based on an average of the I/O use ratio of the WAL and the I/O use ratio of the table data acquired by the I/O statistical information acquiring unit 123, the writing destination setting unit 124 sets the writing destination of a small amount of high-frequency data to one of the WAL stored in the WAL logical disk 22 and the WAL stored in the second storage medium 30. The writing destination setting unit 124 compares the average of the I/O use ratio of the WAL and the I/O use ratio of the table data acquired by the I/O statistical information acquiring unit 123 with a first prescribed value set in advance for the average of the I/O use ratio of the WAL and the I/O use ratio of the table data. Based on the comparison result, the writing destination setting unit 124 sets the writing destination of a small amount of high-frequency data to one of the WAL stored in the WAL logical disk 22 and the WAL stored in the second storage medium 30. The first prescribed value is "35% or lower" indicated in the column of the prescribed value of the I/O use ratio average in the prescribed value table 111a.

Specifically, if the average of the I/O use ratio of the WAL and the I/O use ratio of the table data exceeds the first prescribed value, the writing destination setting unit 124 sets the writing destination of a small amount of high-frequency data to the WAL stored in the second storage medium 30. In this case, the writing destination setting unit 124 calculates the deviation of the amount of writing to the WAL at one time and the writing granularity ratio based on the result of acquisition by the I/O statistical information acquiring unit 123 from the certain prescribed values. The writing destination setting unit 124 refers to the writing destination definition table 112a and sets the WAL stored in the second storage medium 30 corresponding to the calculated deviation as the writing destination of a small amount of data.

If the average of the I/O use ratio of the WAL and the I/O use ratio of the table data is equal to or smaller than the first prescribed value, and the writing destination of a small amount of high-frequency data is the WAL stored in any one of the second storage media 30, the writing destination setting unit 124 sets the writing destination of a small amount of high-frequency data to the WAL stored in the physical disk 20 or another second storage medium 30 other than the second storage medium 30 serving as the writing destination of a small amount of high-frequency data based on the average of the I/O use ratio of the WAL and the I/O use ratio of the table data in the WAL logical disk 22 and the second storage medium 30.

Writing Destination Setting by the Control Device

The following describes setting of the writing destination of a small amount of high-frequency data by the control device 10. FIGS. 5 to 9 are diagrams for explaining writing destination setting by the control device 10 illustrated in FIG. 1. To simplify the description, FIGS. 5 to 9 illustrate the physical disk 20, the second storage medium 30, and the main part of the control device 10.

The I/O statistical information acquiring unit 123 monitors the state of access to the table data logical disk 21 and the WAL logical disk 22 of the physical disk 20. The I/O statistical information acquiring unit 123 acquires the I/O use ratio of the WAL and the I/O use ratio of the table data (refer to the arrows Y10 in FIG. 5). In addition, the I/O statistical information acquiring unit 123 acquires the frequency of writing to the WAL, the amount of writing to the WAL, the frequency of writing to the table data, and the amount of writing to the table data. Based on the acquired information, the I/O statistical information acquiring unit 123 updates the I/O statistical information 113 with the I/O statistical information table 113a illustrated in FIG. 6, for example.

The I/O statistical information acquiring unit 123 notifies the writing destination setting unit 124 of the acquired I/O use ratio of the WAL and the acquired I/O use ratio of the table data (refer to (1) in FIG. 5). At this time, the I/O statistical information acquiring unit 123 also notifies the writing destination setting unit 124 of the frequency of writing to the WAL, the amount of writing to the WAL, the frequency of writing to the table data, and the amount of writing to the table data.

Based on the I/O use ratio of the WAL and the I/O use ratio of the table data received from the I/O statistical information acquiring unit 123, the writing destination setting unit 124 calculates an average of the I/O use ratio of the WAL and the I/O use ratio of the table data (refer to (2) in FIG. 5). In addition, the writing destination setting unit 124 calculates the writing granularity ratio by applying the frequency of writing to the WAL, the amount of writing to the WAL, the frequency of writing to the table data, and the amount of writing to the table data received from the I/O statistical information acquiring unit 123 to Expression (1).

Figure 6:
FIG. 6 is another diagram for explaining writing destination setting by the control device illustrated in FIG. 1.

The writing destination setting unit 124, for example, calculates the values used for determination in writing destination setting using the values in the respective columns of the I/O statistical information table 113a illustrated in the upper figure of FIG. 6 as indicated by a calculation result 114a illustrated in the lower figure of FIG. 6 (refer to the arrow Y11 in FIG. 6). Specifically, as illustrated in the calculation result 114a in FIG. 6, the writing destination setting unit 124 calculates a trigger of the I/O use ratio of "45%" (refer to the column C1) and a writing granularity ratio of "0.0375" (refer to the column C3) and obtains a frequency of writing to the WAL of "80 times per second" (refer to the column C2) using the values in the respective columns of the I/O statistical information table 113a.

Figure 7:
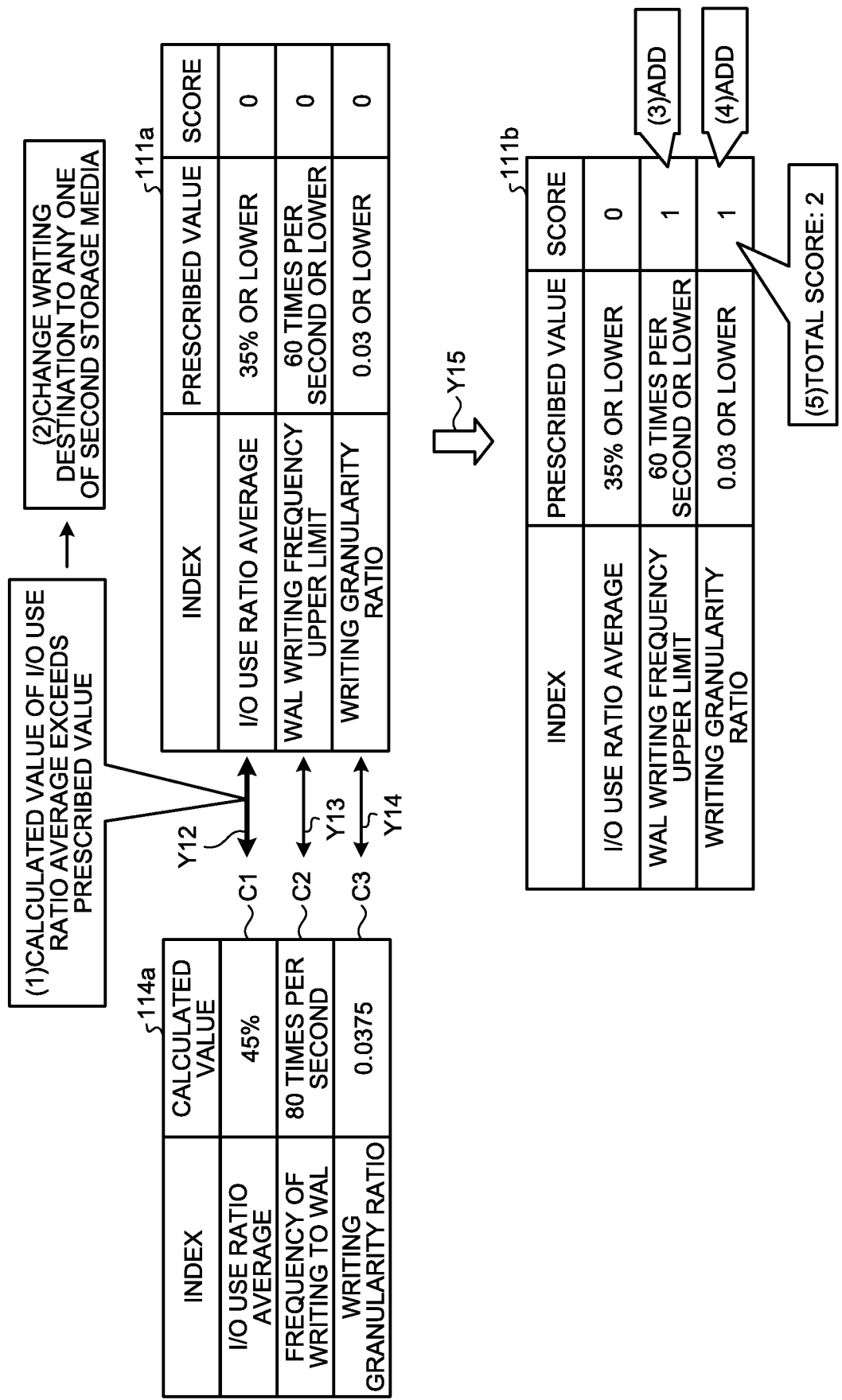
FIG. 7 is still another diagram for explaining writing destination setting by the control device illustrated in FIG. 1.

Subsequently, as illustrated in FIG. 7, the writing destination setting unit 124 compares the calculation result 114a with the values in the prescribed value table 111a. The writing destination setting unit 124 compares the average of the I/O use ratio of the WAL and the I/O use ratio of the table data calculated by itself with the prescribed value of the I/O use ratio average of "35% or lower" in the prescribed value table 111a (refer to the arrow Y12 in FIG. 7). The writing destination setting unit 124 determines whether the average of the I/O use ratio of the WAL and the I/O use ratio of the table data calculated by itself exceeds the prescribed value of the I/O use ratio average in the prescribed value table 111a (refer to (1) in FIG. 7).

In this case, the average of the I/O use ratio of the WAL and the I/O use ratio of the table data in the column C1 of the calculation result 114a is "45%" and exceeds the prescribed value of the average of the I/O use ratio of the WAL and the I/O use ratio of the table data of "35% or lower" in the prescribed value table 111a. As a result, the writing destination setting unit 124 changes the writing destination of a small amount of high-frequency data to the WAL stored in any one of the second storage media 30 (refer to (2) in FIG. 7).

The following describes determining which one of the second storage media 30 is set as the writing destination of a smaller amount of high-frequency data by the writing destination setting unit 124. The writing destination setting unit 124 calculates the deviation from the certain prescribed values. In other words, the writing destination setting unit 124 compares the frequency of writing to the WAL and the writing granularity ratio with the respective prescribed values, thereby calculating the deviation.

Specifically, the writing destination setting unit 124 compares the frequency of writing to the WAL in the column C2 of the calculation result 114a with the prescribed value (second prescribed value) of the frequency of writing to the WAL in the prescribed value table 111a (refer to the arrow Y13 in FIG. 7). In the example illustrated in FIG. 7, the frequency of writing to the WAL of "80 times per second" in the column C2 of the calculation result 114a exceeds the prescribed value of the frequency of writing to the WAL of "60 times per second" in the prescribed value table 111a. As described above, if the actual frequency of writing to the WAL in the calculation result 114a exceeds the prescribed value of the frequency of writing to the WAL, the writing destination setting unit 124 adds a deviation score indicating the degree of deviation of the actual frequency of writing to the WAL from the prescribed value of the frequency of writing to the WAL.

As indicated by the arrow Y15, for example, the writing destination setting unit 124 adds "1" in the score column of the WAL writing frequency upper limit in a prescribed value table 111b as the deviation score indicating the degree of deviation of the actual frequency of writing to the WAL from the prescribed value of the frequency of writing to the WAL (refer to (3) in FIG. 7). The added value of the deviation score is given by way of example only.

Subsequently, the writing destination setting unit 124 compares the writing granularity ratio in the column C3 of the calculation result 114a with the prescribed value (third prescribed value) of the writing granularity ratio in the prescribed value table 111a (refer to the arrow Y14). In the example illustrated in FIG. 7, the writing granularity ratio of "0.0375" in the column C3 of the calculation result 114a exceeds the prescribed value of the writing granularity ratio of "0.03 or lower" in the prescribed value table 111a. As described above, if the actually calculated writing granularity ratio in the calculation result 114a exceeds the prescribed value of the writing granularity ratio, the writing destination setting unit 124 adds a deviation score indicating the degree of deviation of the actual writing granularity ratio from the prescribed value of the writing granularity ratio.

As indicated by the arrow Y15, for example, the writing destination setting unit 124 adds "1" in the score column of the writing granularity ratio in the prescribed value table 111b as the deviation score indicating the degree of deviation of the actual writing granularity ratio from the prescribed value of the writing granularity ratio (refer to (4) in FIG. 7). The added value of the deviation score is given by way of example only.

Subsequently, the writing destination setting unit 124 calculates the total of the deviation scores as the deviation. In the example illustrated in FIG. 7, the writing destination setting unit 124 calculates a total of the deviation scores of "2" as the deviation (refer to (5) in FIG. 7).

Figure 8:
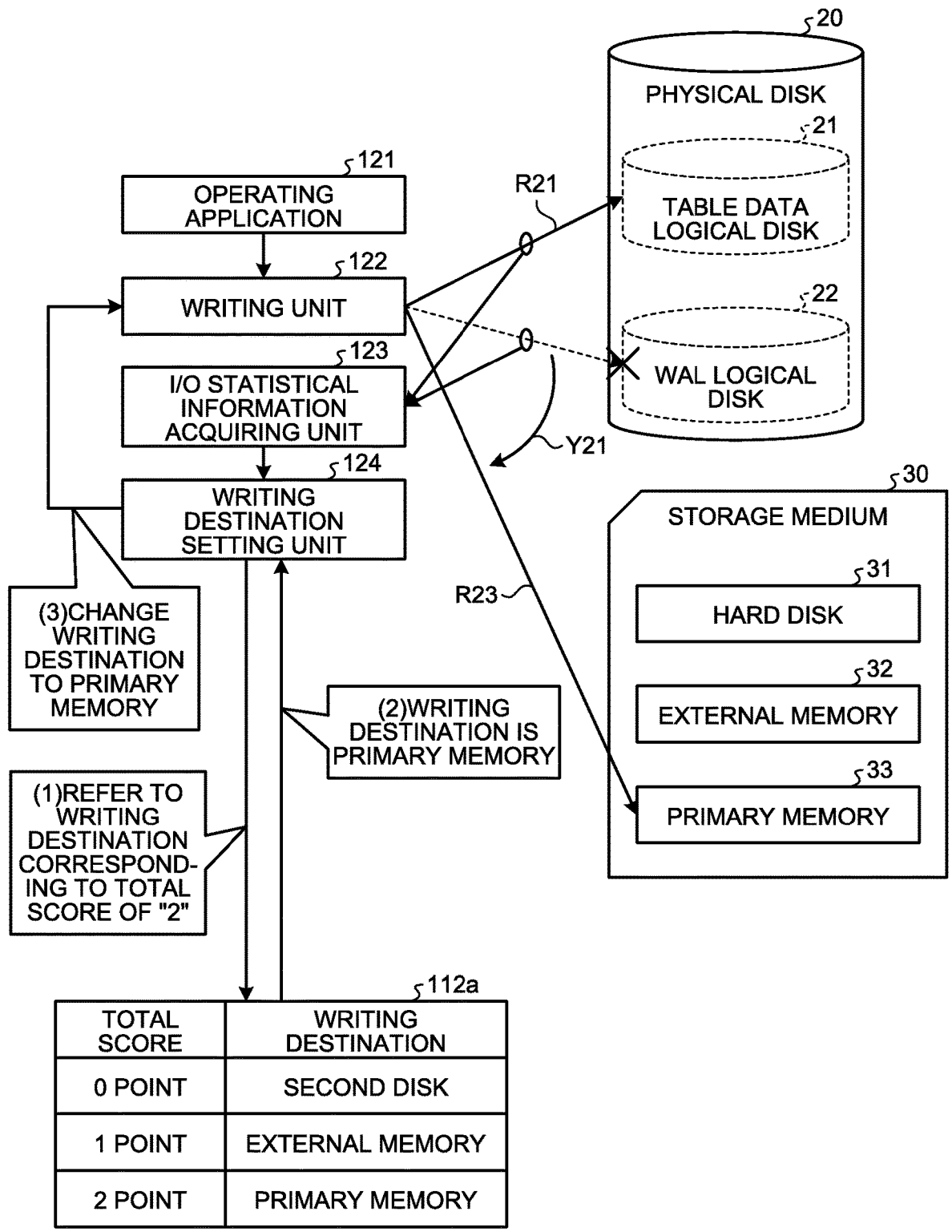
FIG. 8 is still another diagram for explaining writing destination setting by the control device illustrated in FIG. 1.

The writing destination setting unit 124 sets the WAL stored in the second storage medium 30 corresponding to the calculated deviation as the writing destination of a small amount of high-frequency data. As illustrated in FIG. 8, the writing destination setting unit 124 refers to the writing destination corresponding to the total score of "2" in the writing destination definition table 112a (refer to (1) in FIG. 8). The writing destination setting unit 124 refers to the writing destination definition table 112a to determine that the writing destination corresponding to the total score of "2" is the primary memory 33 (refer to (2) in FIG. 8). Subsequently, the writing destination setting unit 124 instructs the writing unit 122 to change the writing destination of a small amount of high-frequency data to the WAL stored in the primary memory 33 (refer to (3) in FIG. 8).

Based on the instruction from the writing destination setting unit 124, the writing unit 122 changes the writing destination of a small amount of high-frequency data from the WAL logical disk 22 of the physical disk 20 to the primary memory 33 out of the storage media 30 (refer to the arrow Y21 in FIG. 8). The writing unit 122 accesses the primary memory 33 (refer to the route R23 in FIG. 8) and writes a small amount of high-frequency data to the WAL stored in the primary memory 33. The writing destination of a large amount of low-frequency data remains the table data logical disk 21 of the physical disk 20 (refer to the route R21 in FIG. 8).

The following describes a case where the writing destination setting unit 124 determines that the average of the I/O use ratio of the WAL and the I/O use ratio of the table data calculated by itself is equal to or smaller than the prescribed value of the I/O use ratio average in the prescribed value table. Specifically, the writing destination setting unit 124 receives notification of the I/O use ratios from the I/O statistical information acquiring unit 123 (refer to (1) in FIG. 9) and determines that the average of the I/O use ratio of the WAL and the I/O use ratio of the table data calculated by itself is equal to or smaller than the prescribed value of the I/O use ratio average in the prescribed value table (refer to (2) in FIG. 9).

In this case, the writing destination setting unit 124 checks whether the writing destination of a small amount of high-frequency data is any one of the second storage media 30. In the example illustrated in FIG. 9, the writing destination of a small amount of high-frequency data is any one of the second storage media 30 (refer to (3) in FIG. 9). In this case, the writing destination setting unit 124 instructs the writing unit 122 to change the writing destination of a small amount of high-frequency data from any one of the second storage media 30 serving as the writing destination to the WAL stored in the WAL logical disk 22 of the physical disk 20 or another second storage medium 30 other than the second storage medium serving as the writing destination of a small amount of high-frequency data. The writing destination setting unit 124 sets the writing destination of a small amount of high-frequency data based on the average of the I/O use ratio of the WAL and the I/O use ratio of the table data in the WAL logical disk 22 of the physical disk 20 and the second storage medium 30. Specifically, the writing destination setting unit 124 sets the WAL logical disk 22 or the second storage medium 30 having the lowest average of the I/O use ratio of the WAL and the I/O use ratio of the table data out of the WAL logical disk 22 of the physical disk 20 and the second storage medium 30 as the writing destination of a small amount of high-frequency data. If the WAL logical disk 22 of the physical disk 20 has the lowest average of the I/O use ratio of the WAL and the I/O use ratio of the table data, for example, the writing destination setting unit 124 instructs the writing unit 122 to change the writing destination of a small amount of high-frequency data to the WAL stored in the WAL logical disk 22 (refer to (4) in FIG. 9).

Figure 9:
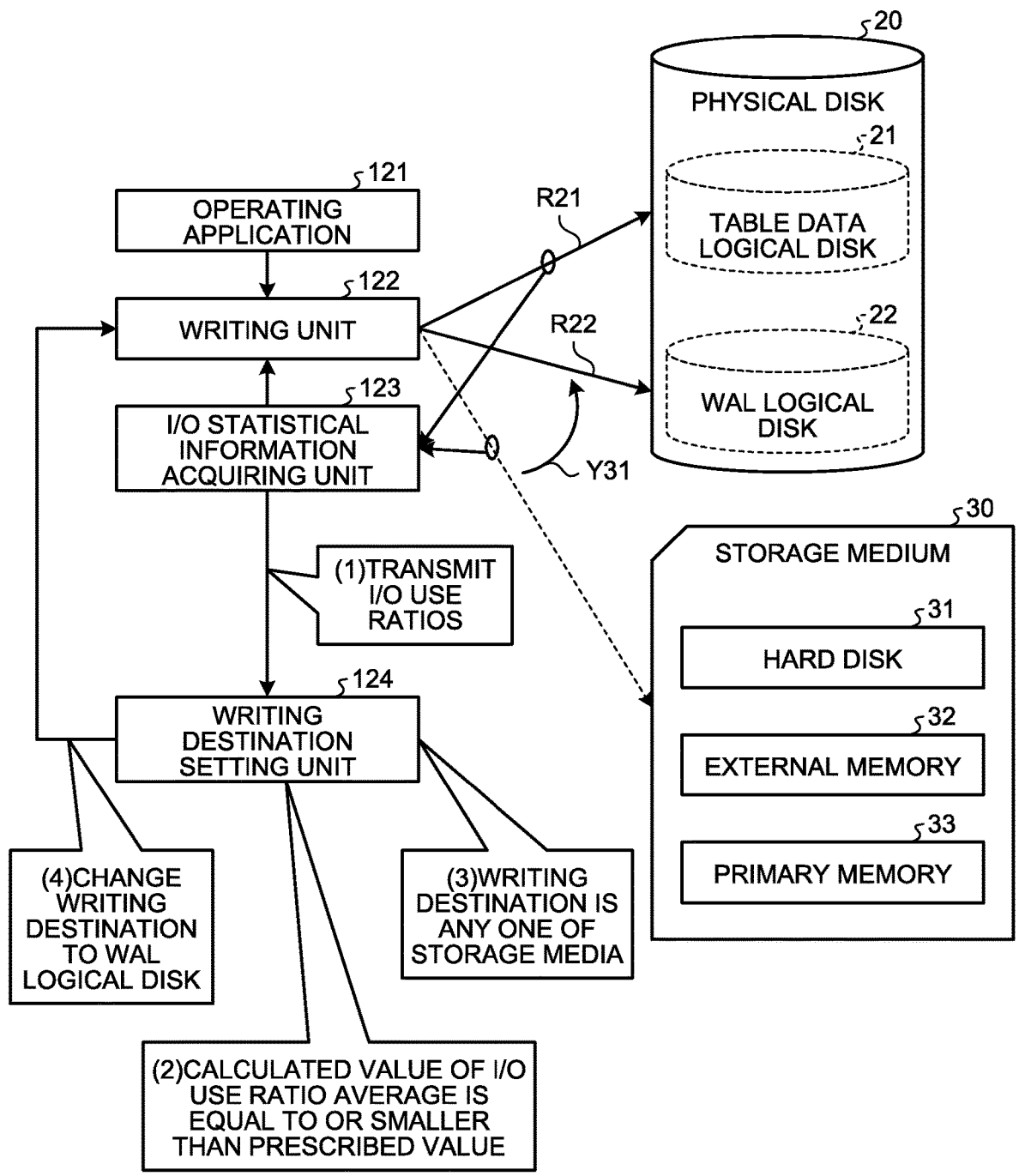
FIG. 9 is still another diagram for explaining writing destination setting by the control device illustrated in FIG. 1.

Based on the instruction from the writing destination setting unit 124, the writing unit 122 changes the writing destination of a small amount of high-frequency data from the storage medium 30 to the WAL logical disk 22 of the physical disk 20 (refer to the arrow Y31 in FIG. 9). The writing unit 122 accesses the WAL logical disk 22 of the physical disk 20 (refer to the route R22 in FIG. 9) and writes a small amount of high-frequency data to the WAL stored in the WAL logical disk 22 of the physical disk 20.

Procedure of Writing Destination Setting by the Control Device

Figure 10:
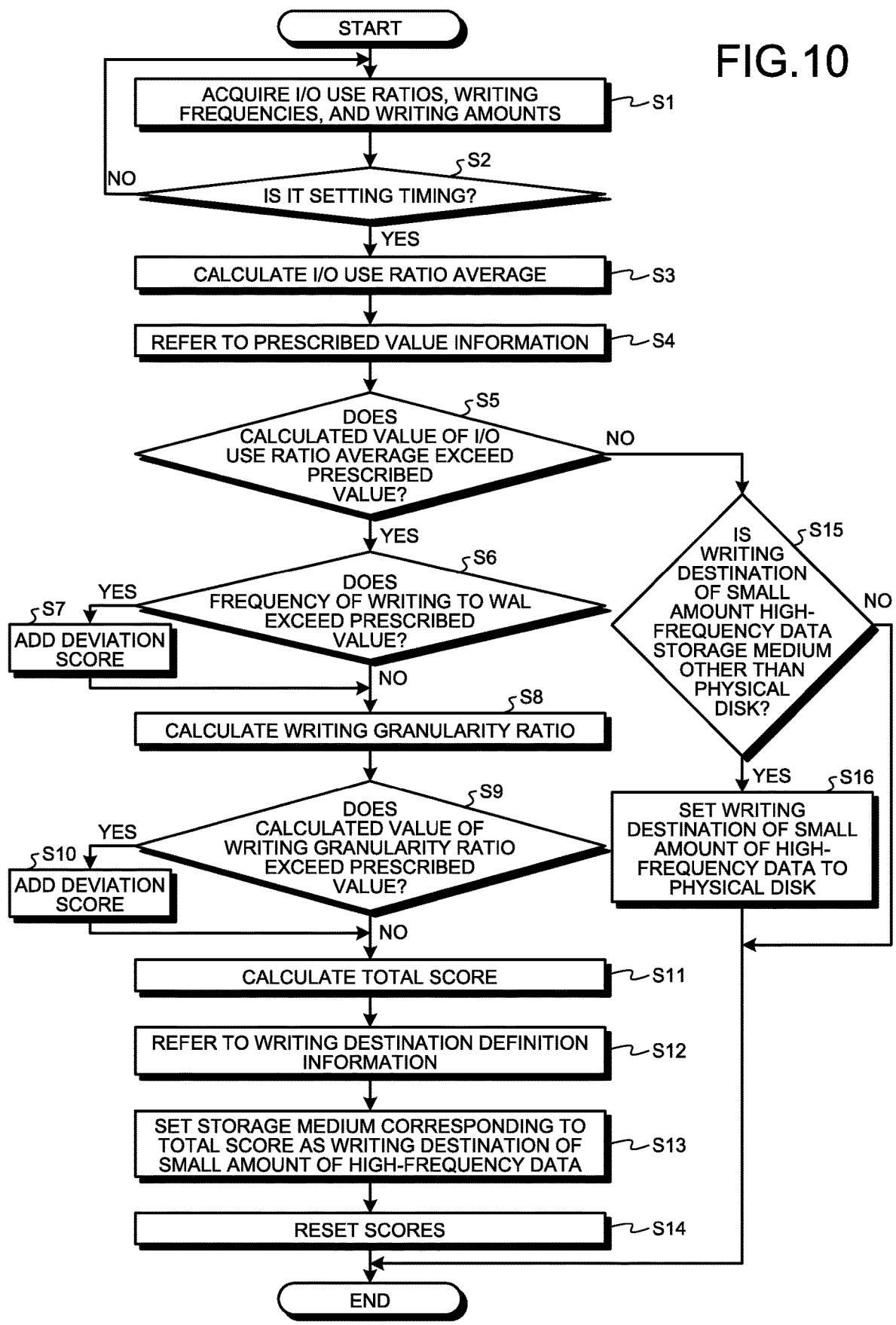
FIG. 10 is a flowchart of a procedure of writing destination setting according to the embodiment.

The following describes the procedure of writing destination setting by the control device 10 with reference to FIG. 10. FIG. 10 is a flowchart of the procedure of writing destination setting according to the embodiment.

As illustrated in FIG. 10, the I/O statistical information acquiring unit 123 monitors the state of access to the physical disk 20 and the second storage medium 30 to acquire the I/O use ratio of the WAL, the I/O use ratio of the table data, the frequency of writing to the WAL, the amount of writing to the WAL, the frequency of writing to the table data, and the amount of writing to the table data (Step S1). The writing destination setting unit 124 determines whether it is a setting timing to set the writing destination (Step S2). The writing destination setting unit 124 may set the writing destination periodically or when the average of the I/O use ratio of the WAL and the I/O use ratio of the table data exceeds a predetermined value, for example.

If the writing destination setting unit 124 determines that it is not a setting timing to set the writing destination (No at Step S2), the process is returned to Step S1, and the I/O statistical information acquiring unit 123 acquires the I/O use ratios and other information again. By contrast, if the writing destination setting unit 124 determines that it is a setting timing to set the writing destination (Yes at Step S2), the writing destination setting unit 124 calculates an average of the I/O use ratio of the WAL and the I/O use ratio of the table data (Step S3). Subsequently, the writing destination setting unit 124 refers to the prescribed value information 111 (Step S4). The writing destination setting unit 124 compares the calculated value of the I/O use ratio average with the prescribed value of the I/O use ratio average in the prescribed value information 111 and determines whether the calculated value of the I/O use ratio average exceeds the prescribed value (Step S5).

If the writing destination setting unit 124 determines that the calculated value of the I/O use ratio average exceeds the prescribed value (Yes at Step S5), the writing destination setting unit 124 determines whether the frequency of writing to the WAL exceeds the prescribed value of the frequency of writing to the WAL in the prescribed value information 111 (Step S6). If the writing destination setting unit 124 determines that the frequency of writing to the WAL exceeds the prescribed value of the frequency of writing to the WAL in the prescribed value information 111 (Yes at Step S6), the writing destination setting unit 124 adds a deviation score (Step S7).

If the writing destination setting unit 124 determines that the frequency of writing to the WAL does not exceed the prescribed value of the frequency of writing to the WAL in the prescribed value information 111 (No at Step S6) or after performing the processing at Step S7, the writing destination setting unit 124 calculates the writing granularity ratio (Step S8). The writing destination setting unit 124 determines whether the calculated value of the writing granularity ratio exceeds the prescribed value of the writing granularity ratio in the prescribed value information 111 (Step S9). If the writing destination setting unit 124 determines that the calculated value of the writing granularity ratio exceeds the prescribed value of the writing granularity ratio in the prescribed value information 111 (Yes at Step S9), the writing destination setting unit 124 adds a deviation score (Step S10).

If the writing destination setting unit 124 determines that the calculated value of the writing granularity ratio does not exceed the prescribed value of the writing granularity ratio in the prescribed value information 111 (No at Step S9), or after performing the processing at Step S10, the writing destination setting unit 124 calculates the total of the deviation scores (Step S11).

Subsequently, the writing destination setting unit 124 refers to the writing destination definition information 112 (Step S12). The writing destination setting unit 124 sets the WAL stored in the storage medium 30 corresponding to the total score as the writing destination of a small amount of high-frequency data (Step S13). The writing destination setting unit 124 resets the deviation scores (Step S14) and ends the writing destination setting.

If the writing destination setting unit 124 determines that the calculated value of the I/O use ratio average does not exceed the prescribed value (No at Step S5), the writing destination setting unit 124 determines whether the writing destination of a small amount high-frequency data is a storage medium other than the physical disk 20 (Step S15).

If the writing destination setting unit 124 determines that the writing destination of a small amount high-frequency data is a storage medium other than the physical disk 20 (Yes at Step S15), the writing destination setting unit 124 sets the writing destination of a small amount of high-frequency data to the WAL stored in the WAL logical disk 22 of the physical disk 20, for example, based on the average of the I/O use ratio of the WAL and the I/O use ratio of the table data in the WAL logical disk 22 and the second storage medium 30 (Step S16). Subsequently, the writing destination setting unit 124 ends the writing destination setting. If the writing destination setting unit 124 determines that the writing destination of a small amount high-frequency data is the physical disk 20 (No at Step S15), the writing destination setting unit 124 ends the writing destination setting.

Advantageous Effects of the Embodiment

In DB systems, data frequently accessed in a secondary storage medium (physical disk 20) may be stored in another physical devices which is a cache. Particularly in DB reading, the cache hit ratio of the DB increases, and reading from the physical disk 20 is infrequently performed when reading from the cache is more frequently performed. In a typical DBMS, such as MySQL, writing to the physical disk 20 includes writing of a large amount low-frequency data to the table data and writing of a small amount of high-frequency data to the WAL. The ratio of the amounts of writing varies depending on the operations of the system.

To address this, the present embodiment sets the writing destination of a small amount of high-frequency data to the WAL of the physical disk 20 or the WAL stored in any one of the second storage media different from the physical disk 20 based on the result of comparison of the average of the I/O use ratio of the WAL serving as the writing destination of a small amount of high-frequency data and the I/O use ratio of the table data serving as the writing destination of a large amount of low-frequency data with the first prescribed value set in advance for the average of the I/O use ratio of the WAL and the I/O use ratio of the table data.

Specifically, if the average of the I/O use ratio of the WAL and the I/O use ratio of the table data exceeds the first prescribed value, the present embodiment sets the writing destination of a small amount of data to the second storage medium. By contrast, if the average of the I/O use ratio of the WAL and the I/O use ratio of the table data is equal to or smaller than the first prescribed value, and if the writing destination of a small amount of data is the second storage medium 30, the present embodiment sets the writing destination of a small amount of data to the WAL logical disk of the physical disk 20.

As described above, the present embodiment appropriately sets the writing destination of a small amount of high-frequency data based on the ratio between writing of a large amount low-frequency data to the table data and writing of a small amount of high-frequency data to the WAL. Consequently, the present embodiment avoids a high load due to writing of data to the physical disk 20.

Furthermore, the present embodiment calculates the deviation of the actual frequency of writing to the WAL and the actual writing granularity ratio from the respective prescribed values. The present embodiment thus sets the second storage medium 30 corresponding to the calculated deviation as the writing destination of a small amount of data. As described above, the embodiment appropriately sets the writing destination of a small amount of high-frequency data using the frequency of writing to the WAL and the writing granularity ratio indicating the state of access of the writing unit 122 to the physical disk 20 and the second storage medium 30.

If the frequency of writing to the WAL exceeds the second prescribed value of the frequency of writing to the WAL set in advance, the present embodiment adds a deviation score indicating the degree of deviation of the frequency of writing to the WAL from the second prescribed value. If the writing granularity ratio exceeds the third prescribed value of the writing granularity ratio set in advance, the present embodiment adds a deviation score indicating the degree of deviation of the writing granularity ratio from the third prescribed value. The present embodiment calculates the total of the deviation scores as the deviation. As a result, the present embodiment can appropriately calculate the deviation of the actual frequency of writing to the WAL and the actual writing granularity ratio from the respective prescribed values. Consequently, the present embodiment can appropriately set the writing destination of a small amount of high-frequency data using the deviation.

System Configuration According to the Embodiment

The components of the control device 10 illustrated in FIG. 1 are functionally conceptual and are not necessarily physically configured as illustrated in the figure. In other words, the specific aspects of distribution and integration of the functions of the control device 10 are not limited to those illustrated in the figure. All or part of the components may be distributed or integrated functionally or physically in desired units depending on various kinds of loads and states of use, for example.

All or desired part of the processing performed by the control device 10 may be performed by a CPU, a graphics processing unit (GPU), and a computer program analyzed and executed by the CPU or the GPU. Furthermore, the processing performed by the control device 10 may be performed by hardware by wired logic.

All or part of the automatically performed processing out of the processing described in the embodiment above may be performed manually. Alternatively, all or part of the manually performed processing may be performed automatically by a known method. In addition, the processing procedures, the control procedures, the specific names, and the information including various kinds of data and parameters described above and illustrated in the figures can be optionally changed except unless there is any special mention.

Computer Programs

Figure 11:
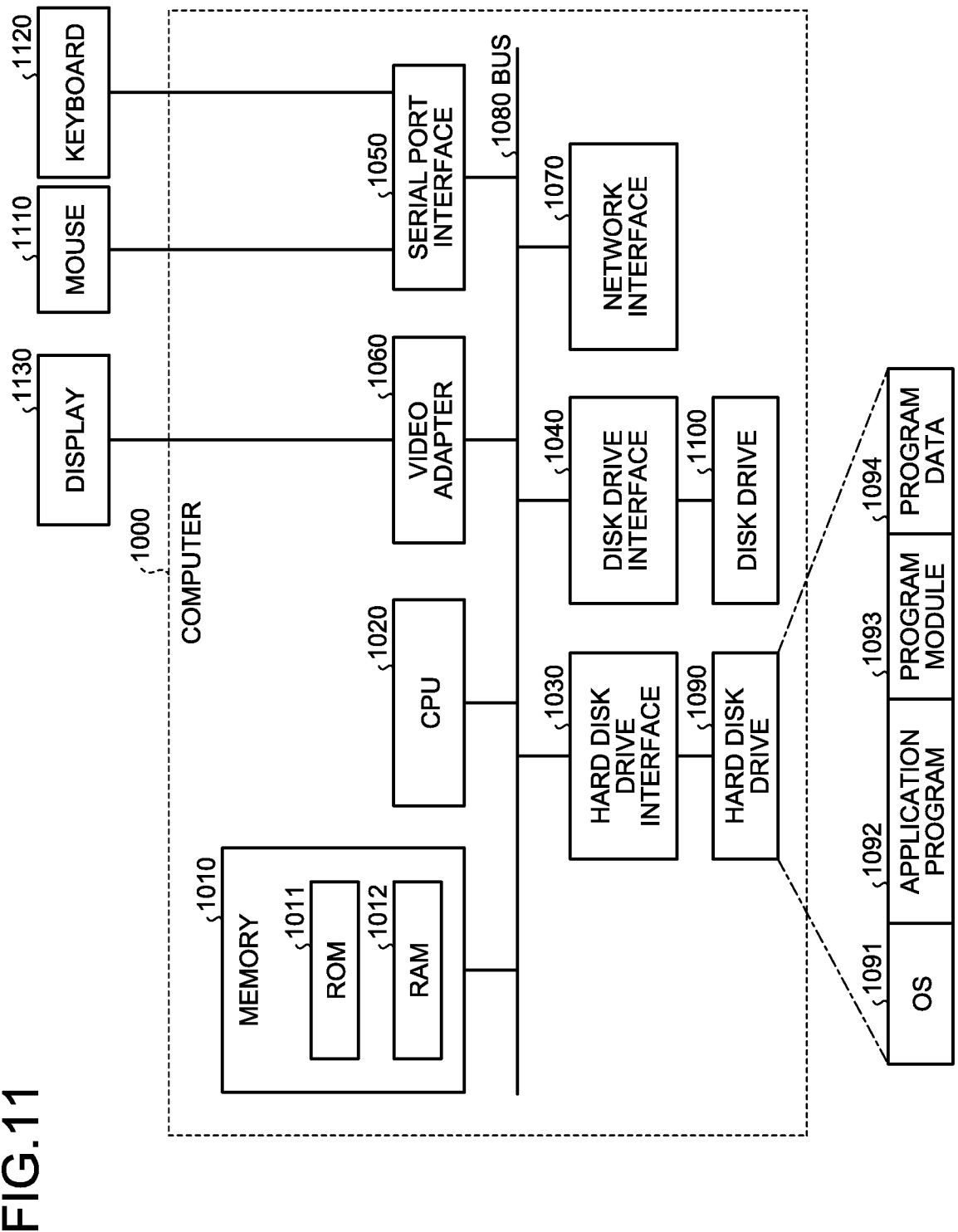
FIG. 11 is a diagram of an example of a computer that serves as the control device by executing a computer program.

FIG. 11 is a diagram of an example of a computer that serves as the control device 10 by executing a computer program. A computer 1000 includes a memory 1010 and a CPU 1020, for example. The computer 1000 also includes a hard disk drive interface 1030, a disk drive interface 1040, a serial port interface 1050, a video adapter 1060, and a network interface 1070. These components are connected by a bus 1080.

The memory 1010 includes a read only memory (ROM) 1011 and a RAM 1012. The ROM 1011 stores therein a boot program, such as a basic input output system (BIOS). The hard disk drive interface 1030 is connected to a hard disk drive 1090. The disk drive interface 1040 is connected to a disk drive 1100. A detachable storage medium, such as a magnetic disk and an optical disc, is inserted into the disk drive 1100. The serial port interface 1050 is connected to a mouse 1110 and a keyboard 1120, for example. The video adapter 1060 is connected to a display 1130, for example.

The hard disk drive 1090 stores therein an OS 1091, an application program 1092, a program module 1093, and program data 1094, for example. In other words, the computer program that defines the processing performed by the control device 10 is provided as the program module 1093 that describes codes executable by the computer 1000. The program module 1093 is stored in the hard disk drive 1090, for example. The program module 1093 for performing the same processing as that of the functional configuration in the control device 10, for example, is stored in the hard disk drive 1090. The hard disk drive 1090 may be replaced by an SSD.

The setting data used in the processing according to the embodiment above is stored in the memory 1010 and the hard disk drive 1090, for example, as the program data 1094.

The CPU 1020 reads and executes the program module 1093 and the program data 1094 stored in the memory 1010 and the hard disk drive 1090 on the RAM 1012 as needed.

The program module 1093 and the program data 1094 are not necessarily stored in the hard disk drive 1090. The program module 1093 and the program data 1094 may be stored in a detachable storage medium, for example, and read by the CPU 1020 via the disk drive 1100. Alternatively, the program module 1093 and the program data 1094 may be stored in a second computer connected via a network (e.g., a local area network (LAN) and a wide area network (WAN)). The program module 1093 and the program data 1094 may be read from the second computer by the CPU 1020 via the network interface 1070.

While an exemplary embodiment according to the invention developed by the inventors have been described, the description and the drawings illustrating part of the disclosure of the present invention in the present embodiment are not intended to limit the invention. In other words, all of other embodiments, examples, and operating techniques conceivable by those skilled in the art based on the present embodiment, for example, fall within the scope of the present invention.

DESCRIPTION OF SIGNS 10 control device
11 storage unit
12 control unit
20 physical disk
21 table data logical disk
22 WAL logical disk
30 storage medium
31 hard disk
32 external memory
33 primary memory
111 prescribed value information
112 writing destination definition information
113 I/O statistical information
121 operating application
122 writing unit
123 I/O statistical information acquiring unit
124 writing destination setting unit

The invention claimed is:
1. A control device comprising:
a memory; and
processing circuitry coupled to the memory and configured to:
detect a state of access to table data stored in a first logical disk of a physical disk and to which first data is written and a state of access to a specific write ahead log (WAL) which is one of a WAL stored in a second logical disk of the physical disk and to which second data is written and a WAL stored in a second storage medium different from the physical disk and to which the second data is written, and acquire an I/O use ratio of the specific WAL and an I/O use ratio of the table data, and
set a writing destination of the second data to one of the WAL stored in the second logical disk and the WAL stored in the second storage medium based on an average of the I/O use ratio of the specific WAL and the I/O use ratio of the table data acquired at the acquiring.
2. The control device according to claim 1, wherein the processing circuitry is further configured to:

set the writing destination of the second data to the WAL stored in the second storage medium when the average of the I/O use ratio of the specific WAL and the I/O use ratio of the table data exceeds a first prescribed value set in advance for the average of the I/O use ratio of the specific WAL and the I/O use ratio of the table data.

3. The control device according to claim 2, wherein a plurality of the second storage media are provided, and the second storage media are each associated with a deviation of a writing granularity ratio from a certain predetermined value, the writing granularity ratio being obtained by dividing a ratio of frequency of writing to the specific WAL per unit time to an amount of writing to the specific WAL by a ratio of frequency of writing to the table data per unit time to an amount of writing to the table data per unit time, the processing circuitry is further configured to:
 acquire the frequency of writing to the specific WAL, the amount of writing to the specific WAL, the frequency of writing to the table data, and the amount of writing to the table data, and
 calculate a deviation of the frequency of writing to the specific WAL and the writing granularity ratio from the certain predetermined value based on a result of acquisition at the acquiring and set the WAL stored in the second storage medium corresponding to the calculated deviation of the frequency of writing as the writing destination of the second data.

4. The control device according to claim 3, wherein the processing circuitry is further configured to:
 add a deviation score indicating a degree of deviation of the frequency of writing to the specific WAL from a second prescribed value of the frequency of writing to the specific WAL set in advance when the frequency of writing to the specific WAL acquired at the acquiring exceeds the second prescribed value,
 add a deviation score indicating a degree of deviation of the writing granularity ratio from a third prescribed value of the writing granularity ratio set in advance when the writing granularity ratio calculated based on the result of acquisition at the acquiring exceeds the third prescribed value, and
 calculate the total of the deviation scores,
 wherein the total of the deviation scores is used to set the writing destination.

5. The control device according to claim 1, wherein the processing circuitry is further configured to:
 set the writing destination of the second data to the WAL stored in the second logical disk or another second storage medium other than the second storage medium serving as the writing destination of the second data based on the average of the I/O use ratio of the specific WAL and the I/O use ratio of the table data in the second logical disk and the second storage medium when the average of the I/O use ratio of the specific WAL and the I/O use ratio of the table data is equal to or smaller than a first prescribed value set in advance for the average of the I/O use ratio of the specific WAL and the I/O use ratio of the table data, and the writing destination of the second data is the second storage medium.

6. A control method comprising:
 detecting a state of access to table data stored in a first logical disk of a physical disk and to which first data is written and a state of access to a specific write ahead log (WAL) which is one of a WAL stored in a second logical disk of the physical disk and to which second data is written and a WAL stored in a second storage medium different from the physical disk and to which a small amount of high-frequency data is written, and acquiring an I/O use ratio of the specific WAL and an I/O use ratio of the table data, by a processor; and
 setting a writing destination of the second data to one of the WAL stored in the second logical disk and the WAL stored in the second storage medium based on an average of the I/O use ratio of the specific WAL and the I/O use ratio of the table data acquired at the acquiring.

7. A non-transitory computer-readable recording medium storing therein a control program that causes a computer to execute a process comprising:
 detecting a state of access to table data stored in a first logical disk of a physical disk and to which first data is written and a state of access to a specific write ahead log (WAL) which is one of a WAL stored in a second logical disk of the physical disk and to which second data is written and a WAL stored in a second storage medium different from the physical disk and to which a small amount of high-frequency data is written, and acquiring an I/O use ratio of the specific WAL and an I/O use ratio of the table data; and
 setting a writing destination of the second data to one of the WAL stored in the second logical disk and the WAL stored in the second storage medium based on an average of the I/O use ratio of the specific WAL and the I/O use ratio of the table data acquired at the acquiring.

* * * * *